United States Patent [19]

Rudolph

[11] 4,434,959
[45] Mar. 6, 1984

[54] AIRFOIL FLAP ASSEMBLY WITH FLAP TRACK MEMBER

[75] Inventor: Peter K. C. Rudolph, Seattle, Wash.

[73] Assignee: The Boeing Company, Seattle, Wash.

[21] Appl. No.: 306,743

[22] Filed: Sep. 28, 1981

[51] Int. Cl.³ .......................... B64C 3/50; B64C 9/20
[52] U.S. Cl. .................................. 244/215; 244/212; 244/213; 244/216
[58] Field of Search ............... 244/215, 216, 219, 211, 244/212, 213, 214, 218

[56] References Cited

U.S. PATENT DOCUMENTS

| | | |
|---|---|---|
| 2,191,839 | 2/1940 | Zap . |
| 2,352,062 | 6/1944 | Zap . |
| 2,404,954 | 7/1946 | Zap . |
| 2,502,315 | 3/1950 | Earhart . |
| 2,526,929 | 10/1950 | Bowcott . |
| 2,542,792 | 2/1951 | Bennett et al. . |
| 2,556,326 | 6/1951 | Grant . |
| 2,591,000 | 4/1952 | O'Brien . |
| 2,624,532 | 1/1953 | Butler . |
| 2,661,166 | 12/1953 | Gordon . |
| 2,688,455 | 9/1954 | Clark . |
| 2,779,555 | 1/1951 | Danielson . |
| 2,836,380 | 5/1958 | Pearson . |
| 2,974,903 | 3/1961 | Chomart . |
| 3,223,356 | 12/1965 | Alvarez-Calderon . |
| 3,438,598 | 4/1969 | Tammel . |
| 3,438,599 | 4/1969 | Welzen . |
| 3,478,988 | 11/1969 | Roed . |
| 3,528,632 | 9/1970 | Miles et al. . |
| 3,538,660 | 6/1971 | Hurkamp et al. . |
| 3,568,957 | 3/1971 | Wood . |
| 3,698,664 | 10/1972 | Bonney . |
| 3,706,431 | 12/1972 | Smith .................. 244/216 |
| 3,767,140 | 10/1973 | Johnson . |
| 3,778,009 | 12/1973 | Jones . |
| 3,785,594 | 1/1974 | Lee . |
| 3,827,658 | 8/1974 | Hallworth . |
| 3,853,289 | 12/1974 | Nevermann et al. . |
| 4,172,575 | 10/1979 | Cole .................. 244/216 |
| 4,175,575 | 10/1979 | Cole . |

FOREIGN PATENT DOCUMENTS 951122 10/1949 France .
560996 5/1944 United Kingdom .

*Primary Examiner*—Sherman D. Basinger
*Assistant Examiner*—Ivy M. Shum
*Attorney, Agent, or Firm*—Hughes, Barnard & Cassidy

[57] ABSTRACT

An airfoil having a trailing edge flap assembly comprising a flap member having a track mounted thereto. The track member is operatively connected to a slide-block which is in turn mounted to stationary structure. High Fowler motion is accomplished with this arrangement. In another embodiment the flap is additionally provided with a foreflap. In further embodiments, the flap assembly is provided additionally with aft flaps.

25 Claims, 16 Drawing Figures

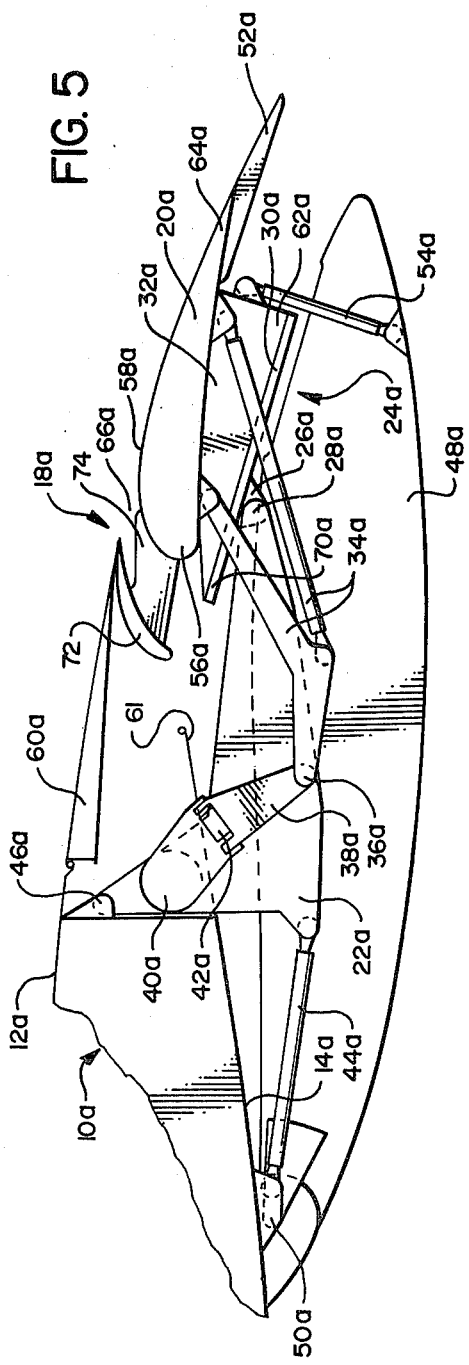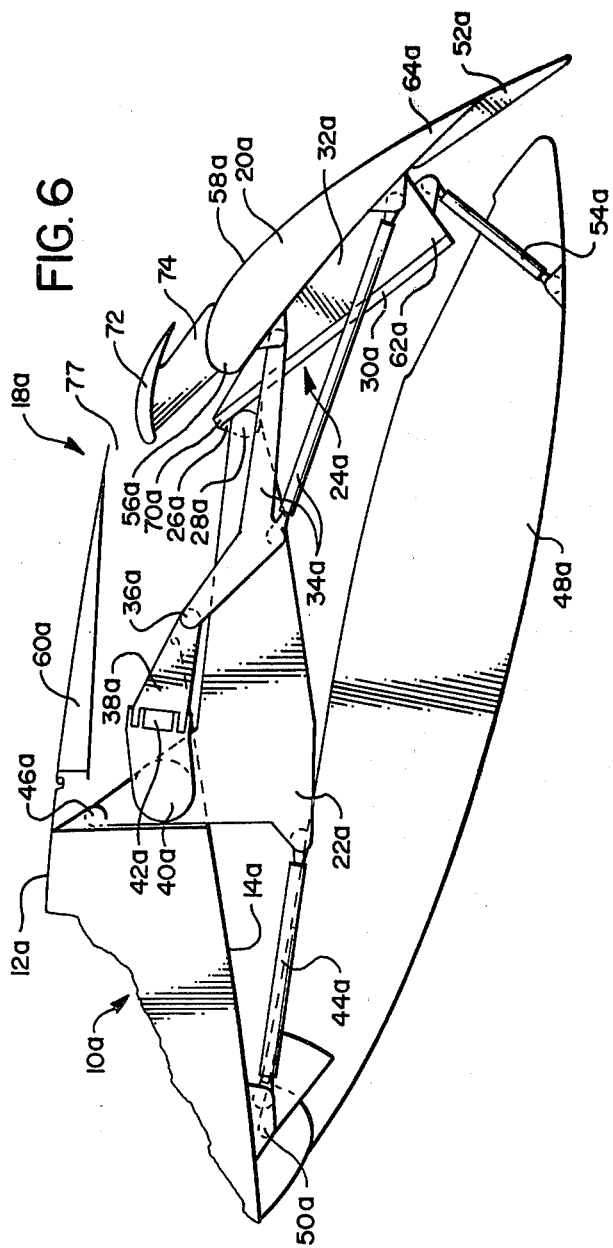

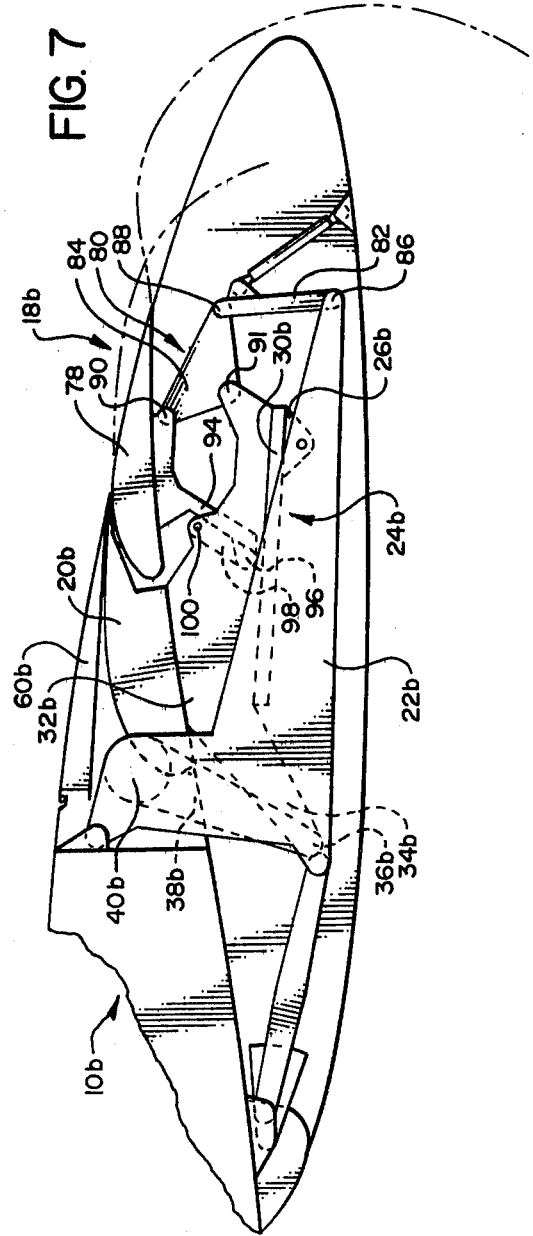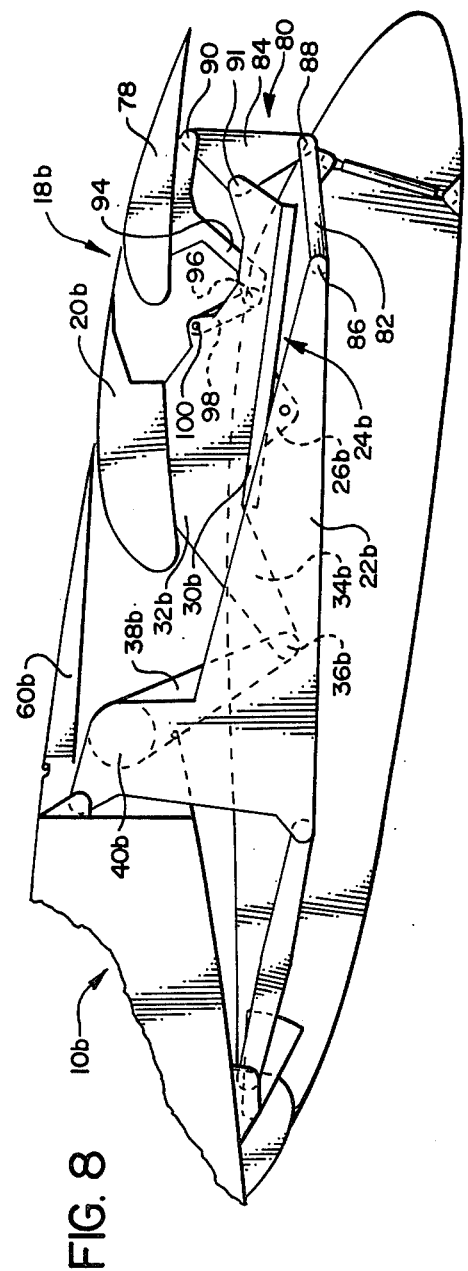

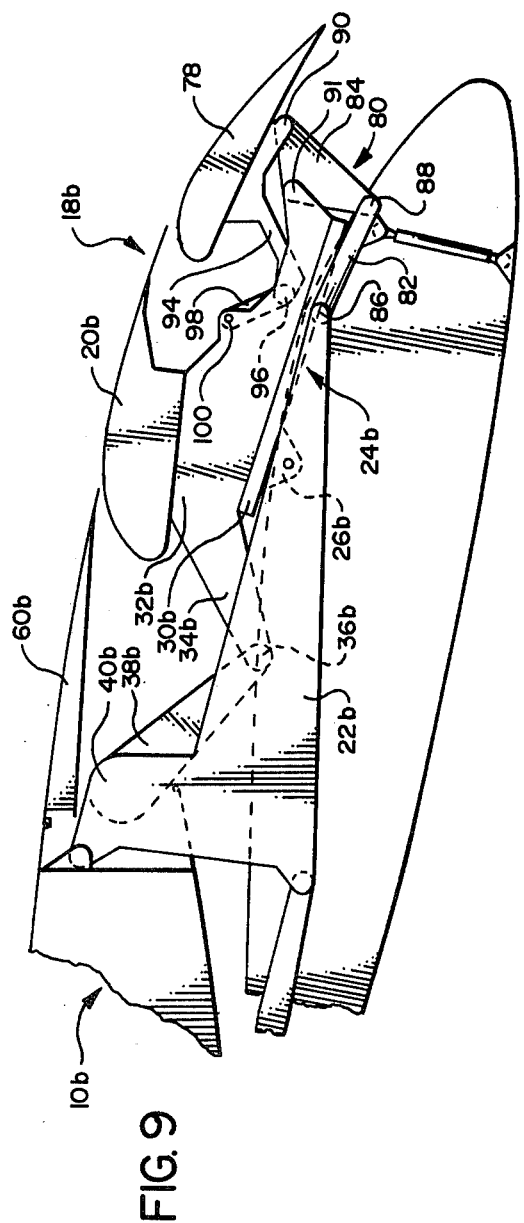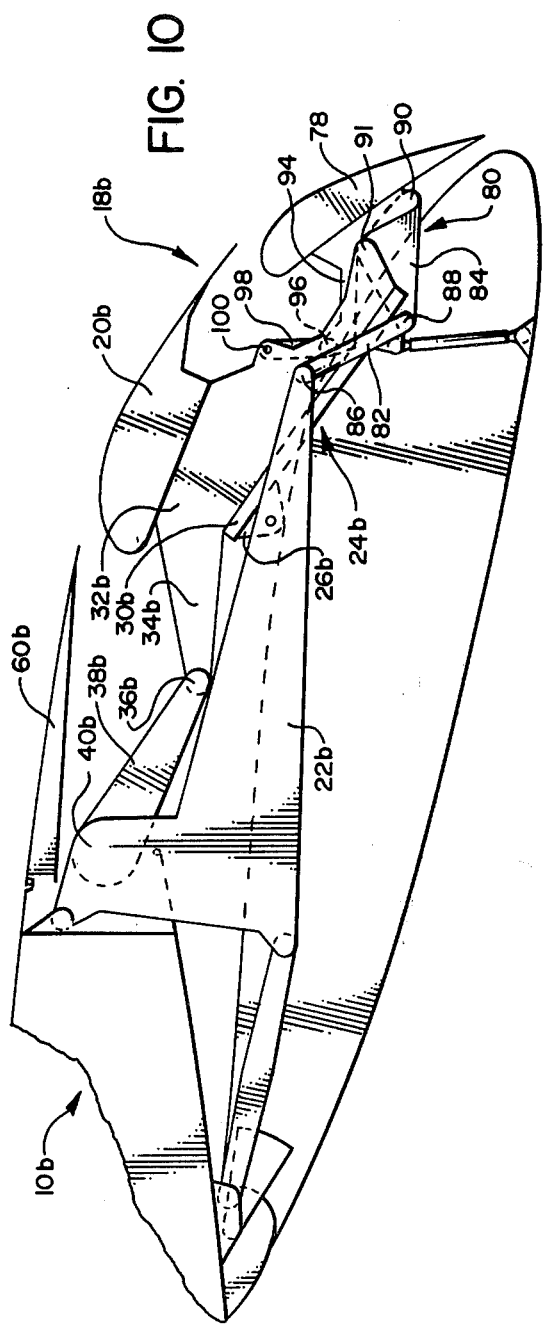

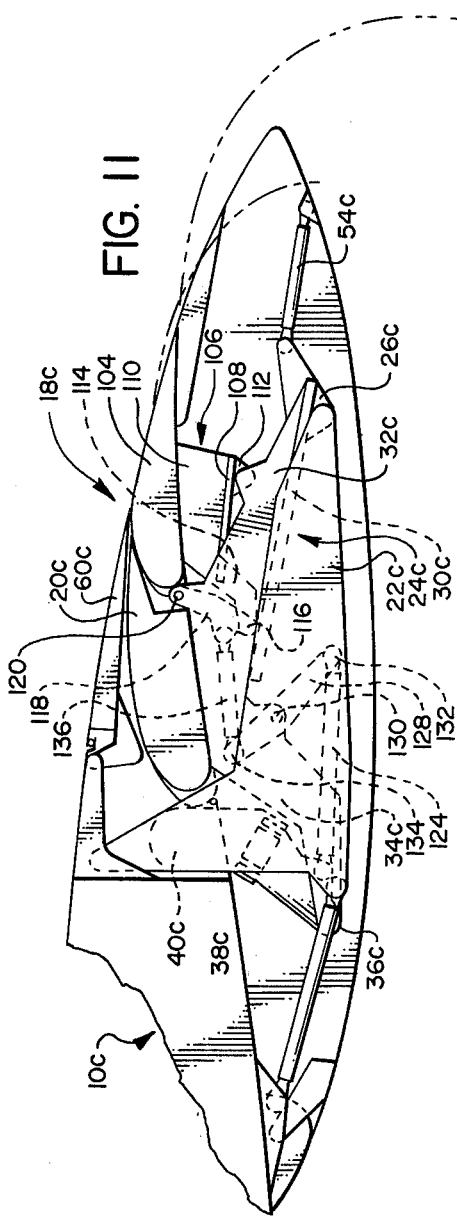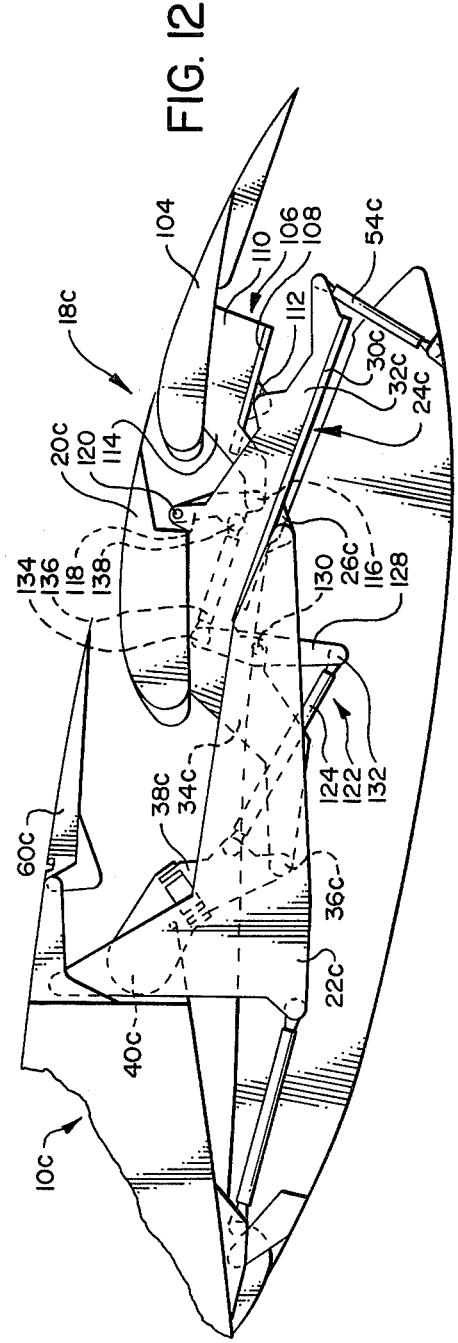

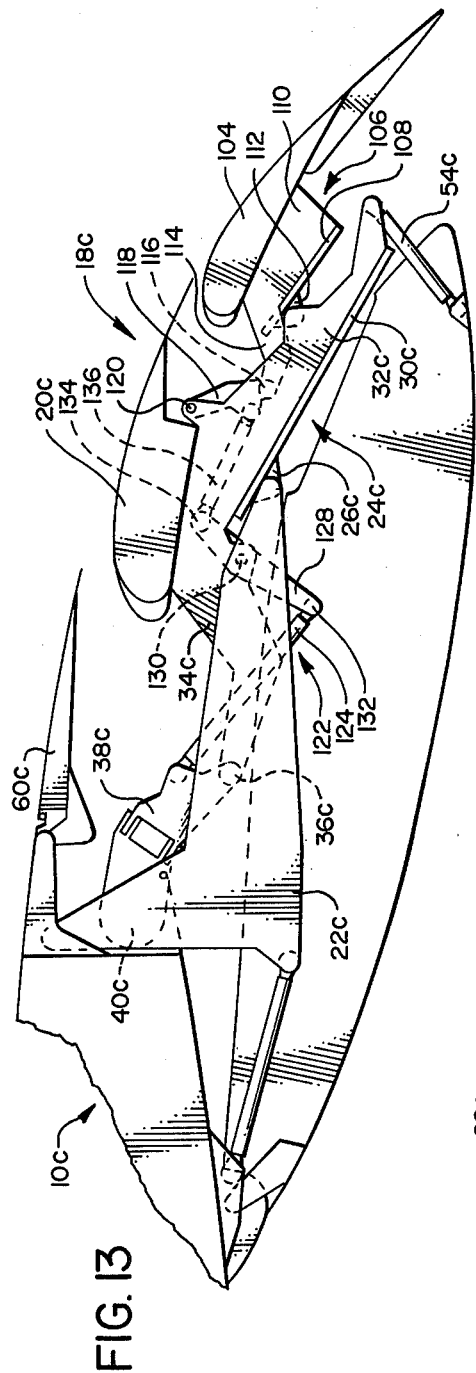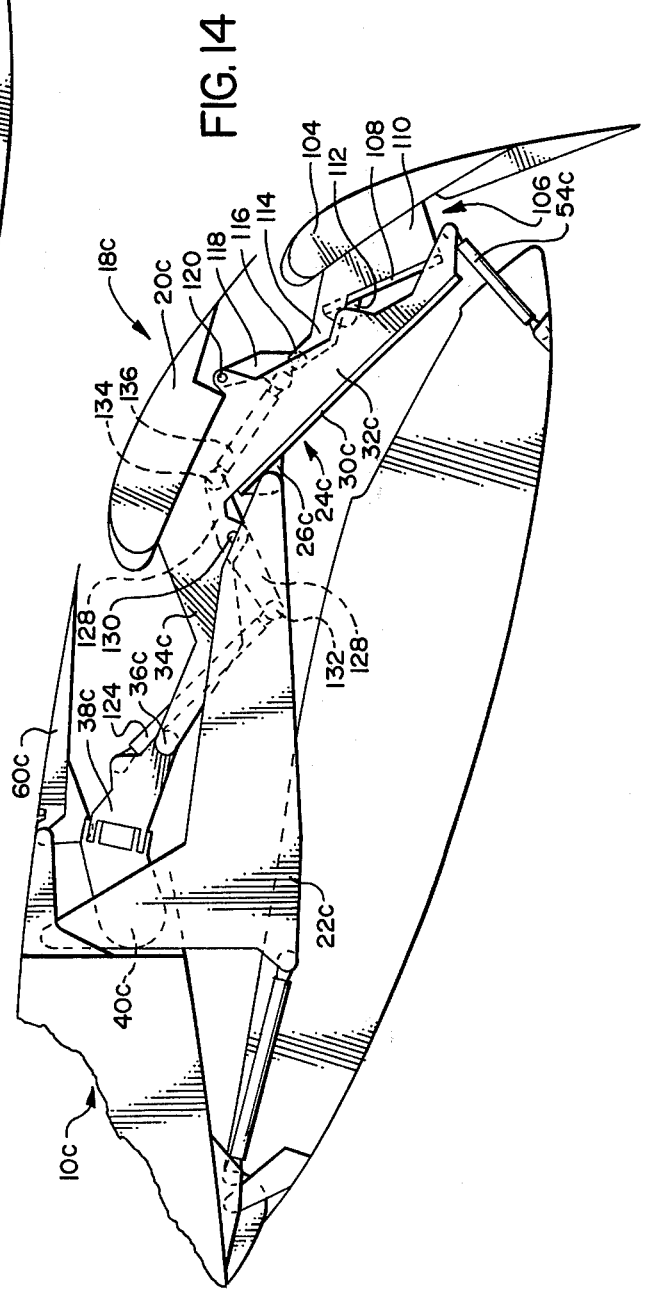

AIRFOIL FLAP ASSEMBLY WITH FLAP TRACK MEMBER

DESCRIPTION

1. Technical Field

The present invention relates to a flap assembly adapted for use as a trailing edge flap of the wing of an airplane.

2. Background Art

The trailing edge flaps of a high performance mance airplane have to perform two functions, namely (a) to provide a high lift to drag ratio take-off configuration, and (b) to provide a high lift coefficient landing configuration. A high lift to drag ratio for take-off can be accomplished by trailing edge flap positions with (a) high Fowler motion (i.e. aft motion which increases wing projected area), (b) a single short and converging slot and, (c) a small flap deflection angle. The high lift coefficient for landing requires (a) high Fowler motion, (b) a short converging slot between the flap and the wing (and two such slots for double slotted flap configuration) and, (c) high flap deflection angles. Theoretically, the best Fowler motion versus flap deflection angle progression would be that the flap would initially move rearwardly with little or no deflection, and at the end of its rearward travel then deflect downwardly for the landing configuration. This can be accomplished with two independent mechanisms, but this is obviously not a practical solution. Therefore, a single flap mechanism that approaches this motion as closely as possible is the most desirable.

The mechanism that guides and drives the flaps from the stowed to the take-off and landing positions is generally located underneath the flaps. To minimize cruise drag, the flap mechanism and the fairing around it should be small. Also, it is desirable that the flap mechanism should be simple and have good wear characteristics. A further desirable feature is to have low flap actuation power requirements. Also, a stowing moment without load reversal is preferable over a deploying load and/or load reversal.

It is quite common for present commercial aircraft to have single, double or triple slotted flaps that travel in curved tracks. While this arrangement does provide for optimum flap positions for take-off and landing with only small, low-drag fairings, the flap track supports are heavy and have inherent in-service problems with track wear and jamming. The main problem arises from the line contact of the highly loaded aft roller on the track.

Another arrangement is used where there is a single slotted flap mounted on an overhead four-bar linkage.

Some short to medium range airplanes are equipped with double slotted flaps, mounted from a simple hinge below the wing. This flap configuration is designed to provide very high lift coefficients for landing, with take-off lift coefficient and lift-to-drag ratio not being critical. The fairing around the flap hinge structure is deep and results in a considerable cruise drag penalty. This is of little consequence on a real short mission.

However, there is need for improvement for mission requirements where there is relatively high gross weight, high altitude, and limited runway length in that there should be an adequately high lift-to-drag ratio for take-off. For a mix of mission requirements, short and long range, with high gross weight and intermediate runway length, intermediate gross weight and short field length, a flap system with the aerodynamic characteristics of the track guided flaps is desirable. Thus, there is still a need for a flap system having the desirable features of the track guided flaps, while alleviating some of the difficulties associated with such track guided flaps.

To determine the sort of flap arrangement needed, consideration should be to three basic mission requirements. First, there is the consideration of the length of the landing field and touch down speed limits of the airplane. This condition becomes the flap sizing criteria on short to medium range airplanes with high wing loading for operation from short runways, including short take-off and landing airplanes (i.e., STOL airplanes). The flap position for landing is the fully extended position for maximum lift coefficient.

The next consideration is the take-off field length limit. This influences the choice of flap assembly configuration particularly where there is high thrust to weight ratio airplanes with a requirement for very short take-off field length.

A third consideration is the one-engineout second segment climb gradient. This condition will generally determine the flap configuration for take-off on twin and three engine airplanes with high wing loading. In order to achieve the minimum climb gradient with one engine failed the airplane lift-to-drag ratio has to be optimized. High lift-to-drag ratios can be achieved with high Fowler motion at low flap angles. Since the flap setting for take-off and second segment climb is usually the same, the take-off flap setting is influenced by both take-off field length (the second consideration noted above) and second segment climb gradient.

With regard to the flap motion from stowed to fully deployed position, there are of course a variety of mechanisms in the prior art. As long as the intermediate flap positions are not critical, the criteria for selecting the mechanism are generally simplicity (with low cost and low risk), low load (low weight) and small size (with the resulting low drag). However, where there are rather stringent requirements for take-off field length limit and also the one-engine-out second segment climb gradient, the intermediate positions of the flap are quite critical. Airplanes which are take-off climb gradient critical need a flap system that provides very high Fowler motion at low flap angles, with most of the flap rotation occurring toward the end of deployment of the flap.

Thus, consideration has been given to achieving a flap assembly configuration which provides adequate Fowler motion with relatively small flap deflection, while requiring only a small flap support fairing with low cruise drag. It is an object of the present invention to provide such a flap assembly, with a desirable mix of advantageous features such as those discussed above.

A search of the patent literature has disclosed a number of patents showing various flap configurations and means for deploying the flaps. Typical of these are the following:

U.S. Pat. No. 2,191,839, Zap, shows a trailing edge flap mounted by means of a roller in a curved track.

U.S. Pat. No. 2,352,062, Zap, discloses a trailing edge flap configuration showing flaps not only employing a simple hinge, but also circular arc tracks In some configurations, these are used separately, and in others, the two are combined, with the track itself being hinge mounted.

U.S. Pat. No. 2,404,895, Zap, discloses a trailing edge flap where there is an arcuate mounting member mounted for forward and rearward movement in the rear part of the wing. A trailing edge flap is in turn mounted by rollers to the mounting member so as to track along the length of the mounting member.

U.S. Pat. No. 2,502,315, Erhart, shows a trailing edge flap configuration where there are two slide-ways of a particular configuration to which the flap is mounted.

U.S. Pat. No. 2,526,929, Bowcott, shows a trailing edge flap that is mounted by a pair of rollers in a curved track.

U.S. Pat. No. 2,542,792, Bennett et al, has a trailing edge flap hinge mounted to a rear portion of the aircraft. There is an intermediate flap which is deployed above and forwardly of the main hinge mounted flap.

U.S. Pat. No. 2,556,326, Grant, also shows a hinge mounted trailing edge flap. Further, there is an intermediate flap which has a stowed and a deployed position.

U.S. Pat. No. 2,591,000, O'Brien, has a trailing edge flap that is mounted by struts about a lower center of rotation.

U.S. Pat. No. 2,624,532, Butler, shows a trailing edge flap that is mounted to a slide-way and also to a pivotally mounted mounting arm.

U.S. Pat. No. 2,661,166, Gordon, discloses a trailing edge flap that is pivotally connected at its lower surface to a mounting arm, which in turn, is mounted for fore and aft movement in a slide-way. In addition, the leading edge of the flap is pivotally mounted to an arm.

U.S. Pat. No. 2,688,455, Clark, shows a trailing edge flap that is mounted by a pair of rollers which are mounted in a slide-way.

U.S. Pat. No. 2,779,555, Danielson, discloses a trailing edge flap arrangement where two links are mounted in a slide-way, with differential movement of the links being provided by two chain drives. This causes the flap to tilt as it moves closer to its rear position.

In U.S. Pat. No. 2,836,380, Pearson, there is a trailing edge flap that is mounted by rollers to a slide-way structure.

U.S. Pat. No. 2,974,903, Chomart, shows a trailing edge flap mounted to a stationary track positioned at the elevation of the flap. The forward end of the flap is pivotally connected to a link that is forward of the slideway and pivotally connected by an upper end to stationary structure.

U.S. Pat. No. 3,223,356, Alvarez-Calderon, shows an arrangement of hinge mounted flaps.

U.S. Pat. No. 3,438,598, Tammel, has a trailing edge flap having two support points thereon, each of which is mounted in a respective track. The tracks are arranged so that as the flap moves to its aft position, it is deflected downwardly.

U.S. Pat. No. 3,438,599, Welzen, has a trailing edge flap that is pivotally mounted at a lower location and is also provided with a roller mechanism that tracks to an arcuate member.

U.S. Pat. No. 3,478,988, Roed, shows trailing edge flaps with a hinge mounting.

U.S. Pat. No. 3,528,632, Miles et al, has a trailing edge flap having rollers that are mounted in slide-ways secured to the wing structure.

U.S. Pat. No. 3,568,957, Wood, has a trailing edge flap mounted by rollers to a track.

In U.S. Pat. No. 3,583,660, Hurkamp et al, there is a trailing edge flap mounted by a roller to a circular track. In addition, the track is connected by a linkage to the wing structure.

U.S. Pat. No. 3,698,664, Bonney, is another example of a trailing edge flap mounted by rollers to tracks in the wing structure.

In U.S. Pat. No. 3,767,140, Johnson, there is a flap mechanism where there is a foreflap mounted by a linkage to the wing structure, and a slide-way is mounted to the foreflap. There is an aft flap that is mounted by rollers to the track which is mounted to the foreflap U.S. Pat. No. 3,778,009, Jones, has a trailing edge flap which is mounted by rollers to a track, and also a linkage which connects the flap device to the wing structure.

In U.S. Pat. No. 3,785,594, Lee, also has a flap member mounted to a track. The guides can be uncoupled from one another for further extension of the flap.

In U.S. Pat. No. 3,827,658, Hallworth, there is a mounting member that is mounted in rollers to a track. The flap mechanism is in turn connected to that mounting member.

U.S. Pat. No. 3,853,289, Nevermann et al, shows a trailing edge device where there is a foreflap and aft flap. The foreflap is mounted by a linkage to the wing, and the aft flap is mounted by a roller in a track to the foreflap.

U.S. Pat. No. 4,172,575, Cole, discloses a trailing edge device where there are a pair of flaps mounted by linkages to the wing structure.

In French Patent No. 951,122, there is shown a trailing edge flap mounted by a linkage to the wing.

British Patent 560,996 discloses a trailing edge flap movable from a stowed position to a rearward deployed position. While the mounting arrangement of this flap is not clearly disclosed, the text of this patent indicates that it is mounted from rails.

DISCLOSURE OF THE INVENTION

The flap assembly of the present invention is mounted to an airfoil having a forward end, a rear end, a longitudinal axis and a transverse axis. The flap assembly comprises a mounting structure located at the rear end of the airfoil, said mounting structure having a track mounting portion at a track mounting location. It further comprises a first flap member having a stowed first position at a rear end of the airfoil, and movable rearwardly through an intermediate second position to a fully extended third position.

The flap member has mounted thereto a substantially longitudinally aligned track member operatively connected to said track mounting portion for longitudinal movement relative thereto. The track member has a forward end and a rear end. The track member is characterized in that with the flap member in the first position, the rear end of the track member is at the track mounting location, and with the flap member in its third position, the forward end of the track member is at the track mounting location.

There is actuating means operatively connected to the flap member at a connecting location to move the flap member between its first and third positions. The connecting location is spaced longitudinally from the track mounting location. The actuating means is arranged to move the flap member from the first position to the intermediate position in a manner that the connecting location moves in a first path portion having a substantial longitudinal path component to cause substantial Fowler motion of the flap member with relatively little rotation. The actuating means then moves along a second path portion having a substantial vertical path component to cause substantial rotation of the flap member about the track mounting location in moving from the intermediate position to the third position.

In the preferred form, the actuating means comprises an actuating member which moves along a substantially arcuate path with said first path portion being substantially longitudinally aligned. The second path portion is substantially vertically aligned.

Specifically, the second connecting location is spaced forwardly of the mounting location, and the actuating means is arranged to move the flap member in a manner that it moves the connecting location substantially longitudinally along the first path portion, then along a path having a substantial vertical component in moving the flap member between the second and third positions.

The flap member has a chordwise axis and, in the preferred form, the track member has a lengthwise axis along which it moves relative to the mounting portion. The lengthwise axis of the track member extends rearwardly and downwardly relative to the chordwise axis of the flap member.

Specifically, the track member comprises a slide-way and the mounting portion comprises a slide-block mounted for slide motion in the slide-way. Further, the flap assembly comprises a fairing pivotally mounted at a forward end thereof for downward movement as the flap member moves from its stowed first position to its third position. The flap assembly has link means to cause downward pivotal movement of the fairing.

Further, in the preferred configuration, the flap member and the mounting portion are so arranged relative to the actuating means. that with the flap member in its intermediate position, the flap member forms a slot between the airfoil and the flap member.

In a specific embodiment, the flap assembly comprises a vane member mounted to a leading edge of the flap member. The vane member is positioned so that with the flap member in its intermediate position, the vane member is located adjacent the rear end of the airfoil and above the slot. The flap assembly is further characterized in that with the flap member in its fully extended third position, the vane member is spaced from the rear end of the airfoil to form a second slot with the airfoil.

In a further embodiment, the flap assembly comprises a second flap member having a fourth stowed position adjacent the first flap member, and movable rearwardly to an intermediate fifth position and to a fully deployed sixth position, where the flap member is spaced from the first flap member. In one form of this embodiment, the second flap member is mounted to the first flap member by a linkage which causes the second flap member to move longitudinally and angularly relative to the first flap member as the first flap member moves between its first and third positions.

In another form of that embodiment, the second flap member has a second track member that has a substantial alignment component generally parallel to a chordwise axis of the second flap member. The first flap member has a second track mounting portion to which the second track member is operatively connected for longitudinal movement relative thereto. The flap assembly further comprises second actuating means to cause the second flap member to move rearwardly relative to the first flap member upon rearward movement of the first flap member.

BRIEF DESCRIPTION OF THE DRAWINGS

FIGS. 4, 5 and 6 are views similar to FIGS. 1, 2 and 3, respectively, showing a second embodiment of the present invention;

FIG. 7 is a view similar to FIGS. 1 and 4, showing a third embodiment of the present invention;

FIGS. 8 and 9 are views similar generally to FIGS. 2 and 5, but showing the third embodiment of the present invention in two different intermediate positions;

FIG. 10 is a further view of the third embodiment, similar generally to FIGS. 3 and 6, showing the flap assembly of the third embodiment in its fully deployed position;

FIGS. 11 through 14 are views similar to FIGS. 7 through 10, but showing yet a fourth embodiment of the present invention.

DESCRIPTION OF THE PREFERRED EMBODIMENT

Figure 1:
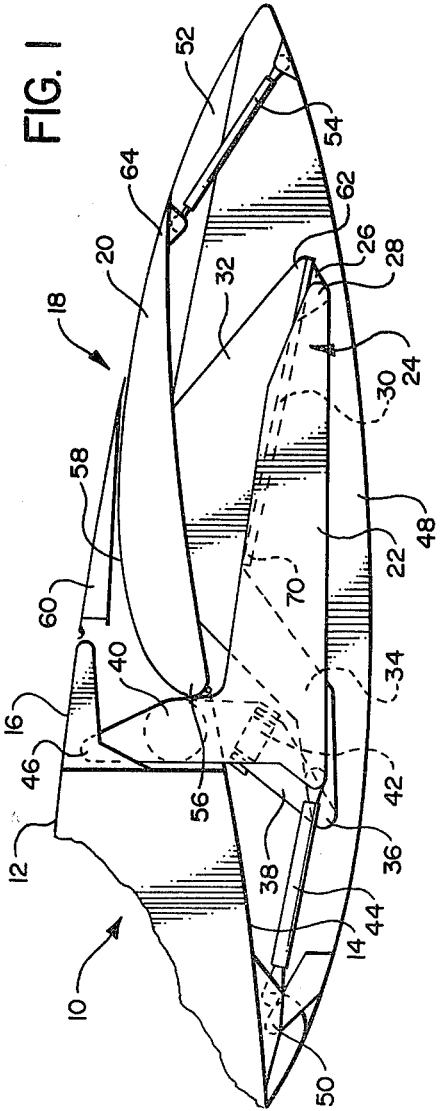
FIG. 1 is a sectional view of an aft portion of an airfoil incorporating the flap assembly in a first embodiment of the present invention, with the flap being in its stowed position.
Figure 2:
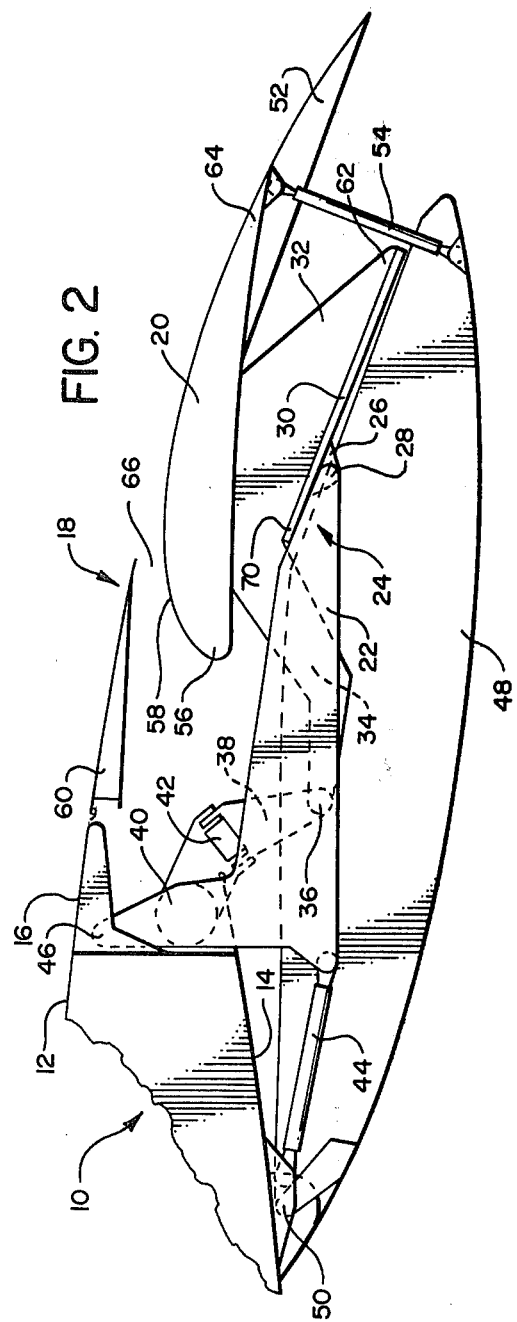
FIG. 2 is a view similar to FIG. 1 showing the flap of FIG. 1 deployed to an intermediate position for takeoff.
Figure 3:
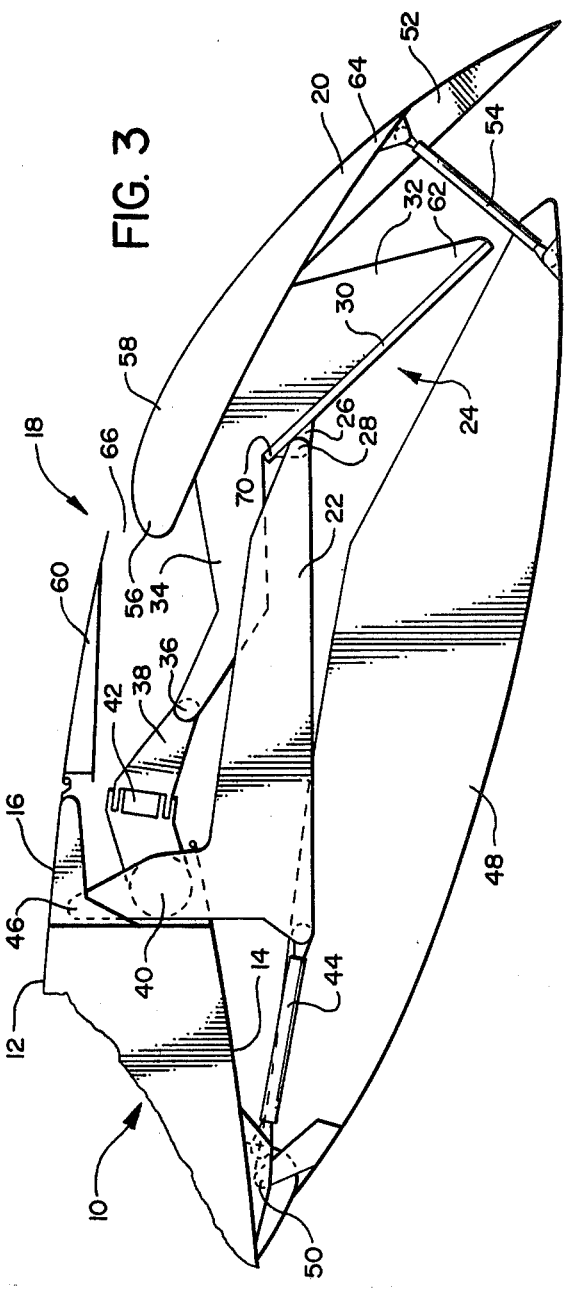
FIG. 3 is a view similar to FIGS. 1 and 2 showing the flap in its fully deployed position.

FIGS. 1 through 3 show a first embodiment of the present invention. There is an airplane wing 10 having an upper surface 12, a lower surface 14, a trailing edge portion 16, and a leading edge (not shown in the drawings for convenience of illustration). There is a flap assembly 18 which comprises single flap member 20 having a stowed position in the trailing edge wing portion 16 (as shown in FIG. 1), and movable through an intermediate position (shown in FIG. 2) to a fully deployed position (shown in FIG. 3). Extending rearwardly from the lower edge of the wing 10, and positioned moderately below the chordwise or longitudinal axis of the wing 10 is a mounting structure 22. With the flap member 20 in its stowed position, the mounting structure 22 is positioned directly below the flap member 20.

The flap member 20 is connected to the mounting structure 22 by means of a track assembly 24. This track assembly 24 comprises a slide-block 26 that is pivotally mounted at 28 to the rear end of the mounting structure 22. The assembly 24 further comprises a track member 30 which is rigidly connected to a mounting bracket 32 which in turn is rigidly connected to the lower side of the flap member 20. The arrangement of the track member 30 and the slide-block 26 is critical in the present invention, and this will be discussed more fully later in this text. Further, it is to be understood that the slide-block 26 could be replaced by a roller carriage with a multitude of rollers in line. However, the preferred configuration is the slide-block, as shown at 26. This slide-block 26 could be, for example, a rectangular slide-block that utilizes carbon inserts or some other means for permanent drive lubrication. The pivot connection of the slide-block 26 to the mounting structure 22 can be, for example, a monoball joint.

Extending downwardly and outwardly from the mounting bracket 32 and also rigidly connected to the lower side of the flap member 20 is a mounting arm 34 which is pivotally connected at its forward end at 36 to an actuating arm 38. The actuating arm 38 is in turn rigidly connected to a rotary hinge 40. If the rearward motion of the flap member 20 is uniform along the length of the flap, then the actuating arm 38 can be a single rigid member. However, if the motion of the flap is not uniform (e.g. where the flap moves rearwardly in a conical or skewed cylindrical motion), then the actuating arm 40 can be provided with a hinge, as at 42.

The aforementioned mounting structure 22 is or may be of conventional design, and, as shown herein, it is connected by its lower forward end to the wing structure by means of two links 44. The forward upper end of the mounting structure 22 can be connected to wing structure, for example, by pivot connections at the location indicated at 46. By adjustment of the links 44, the precise positioning of the slide block 26 can be accomplished.

The mounting structure 22, bracket 32, arm 34, actuating arm 38 and their associated components are enclosed in a fairing 48 that is pivotally attached by its forward end at 50 to the lower rear portion of the wing 10. The upper rear portion 52 of the fairing 48 is made separate from the main fairing 48 and is secured to the lower rear portion of the flap member 20. To tilt the fairing 48 downwardly when the flap member 20 is being moved from its stowed position, there is a positioning link 54 connecting the lower rear end of the flap member 20 to the rear end of the fairing 48. As the flap 20 moves rearwardly, the link 54 moves the fairing 48 downwardly so as to not interfere with the motion of the components during the deploying action.

When the flap assembly 18 is in the stowed position of FIG. 1, the flap is positioned with the flap leading edge 56 closely adjacent to the trailing edge 16 of the wing 10, and also quite close to the rotary hinge 40. In this position, the major portion of the upper flap surface 58 is concealed in the aft portion of the wing structure 10. As shown herein, there is a spoiler 60 extending rearwardly from the upper wing surface 12 and positioned over the flap member 20 in the stowed position. The rear end of the spoiler 60 blends into the rear portion of the upper flap surface 58 so that only the rear portion of the upper flap surface 58 is exposed to the main air stream when the flap assembly 18 is in the stowed position.

Also, in the stowed position of FIG. 1, the actuating arm 38 extends radially from the center of rotation of the rotary hinge 40 downwardly and moderately forwardly, so that the connecting location of the actuating arm 38 (i.e. the pivot connection 36) is below and forward of the center of rotation of the rotary hinge 40.

Further, the flap member 20 is positioned so that the slide-block 26 is at the rear end 62 of the track member 30. In this position, the slide-block 26 is moderately below and just forward of the trailing edge 64 of the flap member 20.

In the stowed position of FIG. 1, the components of the flap assembly 18 are stowed in a relatively compact area so that the fairing 48 can in turn be rather compact so as to create little drag. More specifically, the portion of the flap assembly that extends below the lower wing surface 14 has relatively small depth, which in turn necessitates only a relatively small depth for the fairing 48.

To move the flap member 20 rearwardly, the rotary hinge 40 is rotated in a counterclockwise direction (as seen in FIGS. 1 through 3) so that the initial movement of the connecting location 36 of the actuating arm 38 is in an arcuate path that is mostly rearwardly with a small downward component. Also, the motion of the flap member relative to the location of the slide-block 26 is primarily rearwardly with a small downward component, since in the position of FIG. 1, the track member 30 slants rearwardly and moderately downwardly. The effect of this is that the initial rearward movement of the flap member 20 is such that the forward end of the flap member 20 moves downwardly slightly so that the upper surface 58 of the flap member 20 separates from the spoiler 60.

With further rotation of the actuating arm 38, the arcuate path of the connecting location 36 begins to turn in a moderately upward direction, with the flap sliding rearwardly and moderately downwardly at the location of the slide-block 26, so that the flap member 20 begins to rotate moderately in a clockwise direction (as seen in FIGS. 1 through 3). When the flap member 20 reaches the position of FIG. 2, it is in a typical 10 degree flap setting, with almost two-thirds of total rotation of the actuating arm 38. If it is assumed that the chord length of the flap member 20 is 28% of wing chord length, the Fowler motion at 10 degrees flap angle is 13%. In this position the upper surface 58 of the flap member 20 forms with the spoiler 60 a slot 66 of the desired size and configuration.

To move the flap member 20 further from the intermediate position of FIG. 2 to its fully deployed position of FIG. 3, the rotary hinge 40 is rotated further, with the connecting location 36 of the actuating arm 38 moving in an arcuate path which is more vertical than rearward. This causes the flap member 20 to rotate in a clockwise direction to a substantial extent, with relatively small further rearward movement of the flap member 20. By the time the rotary hinge 40 has rotated fully, the slide-block 26 is positioned in the extreme forward portion 70 of the track member 30. In the landing position shown in FIG. 3, the flap angle is about 36 degrees, and the Fowler motion is about 18%. This clearly shows the advantage of the flap assembly in as much as it provides 72% of the maximum possible Fowler motion at the low 10 degree flap angle.

Figure 4:
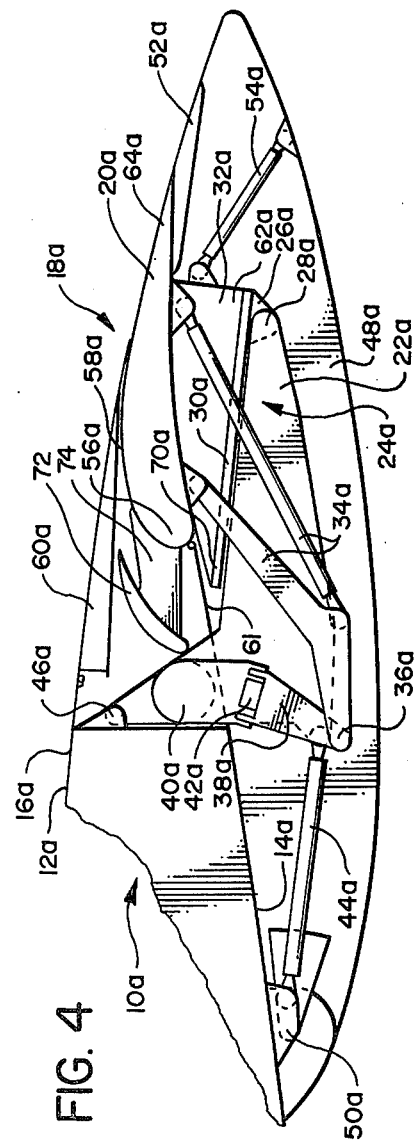

A second embodiment is shown in FIGS. 4 through 6. Components of the second embodiment which are substantially similar to components in the first embodiment will be given like numerical designations, with an "a" suffix distinguishing those of the second embodiment. Thus, there is a wing 10a having a flap assembly 18a comprising a flap member 20a and mounting structure 22a. Also, there is a track assembly 24a comprising a slide-block 26a and track member 30a. To power the mechanism, there is an actuating arm 38a driven by a rotary hinge 40a. The other components which are substantially identical to, or at least quite similar to, corresponding components of the first embodiment are simply given numerical designations with the "a" suffix, and this is believed to suffice in place of any detailed explanation of these components.

The main difference between the first embodiment and the second embodiment is that the second embodiment has a fixed vane/main flap 20a. Thus, there is a small foreflap 72 (i.e. a vane) mounted by a suitable strut 74 at a location forward of the leading edge of the flap member 20a and moderately above the chordwise axis of the flap member 20a.

The manner of deployment of the flap 20a is substantially the same as in the first embodiment, except that the geometry of the components is modified so that the flap member 20a is moved to a steeper angle (e.g. 47 degrees) for landing. The foreflap 72 is positioned so that it will seal against the trailing edge of the spoiler 60a to form a single slotted flap for the 10 degree take-off position of FIG. 5. Thus in the position of FIG. 5 the slot 66a would be formed by the foreflap 72 and the main flap 20a. In the landing position of FIG. 6, the foreflap 72 forms a second slot 77 with the spoiler 60a. As the vane/main flap moves from the stowed position of FIG. 4 to the take-off position of FIG. 5, the vane 72 has to be extracted from the cavity formed by the spoiler 60a and the lower core panel 61 without interfering with these members.

These requirements can be met by selecting the location of the slide-block 26a higher up and further forward, in comparison with the configuration of the first embodiment. This locates the track member 30a closer to the main flap 20a. Since the mode of operation of the second embodiment can be readily understood from an examination of the mode of operation of the first embodiment, no further description will be added.

A third embodiment of the present invention is shown in FIGS. 7, 8, 9 and 10. Components of the third embodiment which are similar to components of the first and second embodiments will be given like numerical designations, with a "b" suffix distinguishing those of the third embodiment. The third embodiment is similar to the first embodiment except that an aft flap is added to provide a double slotted flap configuration.

The third embodiment comprises a wing 10b, a flap assembly 18b, a main flap member 20b, a mounting structure 22b, a track assembly 24b made of a slide-block 26b and a track member 30b, an actuating arm 38b and a rotary hinge 40b. These components operate in substantially the same manner as in the first embodiment, so no further description will be added for those particular components.

In addition to the main flap 20b, there is an aft flap 78 which in the stowed position of FIG. 7 fits snugly in the trailing edge of the main flap 20b. The aft flap 78 is mounted by a linkage which can be described as a four-bar linkage. More specifically, it comprises a rear link 80 made up of a lower link 82 and an upper link 84. The rear edge of the mounting structure 22 is extended rearwardly from the pivot location of the slide-block 26b to pivotally connect at 86 to the lower end of the lower link 82. The upper end of the lower link 82 connects at 88 to the lower end of the upper link 84, and the upper end of the upper link 84 pivotally connects at 90 to the lower rear portion of the aft flap 78.

The middle portion of the upper link 84 is pivotally connected at 91 to the rear portion of the mounting bracket 32b of the main flap member 20b. Thus, as the main flap member 20b is moved rearwardly, the bracket 32b causes the link assembly 80 to move rearwardly, with the upper link 84 rotating in a manner to move the aft flap 78 rearwardly. Thus, the rearward motion of the aft flap 78 is greater than the corresponding rearward movement of the main flap 20b.

Extending downwardly and forwardly from the lower forward end of the aft flap 78 is a mounting arm 94 that connects pivotally at 96 to the lower end of a link 98. The upper end of the link 98 is pivotally connected at 100 to the mounting bracket 32b of the main flap member 20b.

To describe the operation of this third embodiment of FIGS. 7 through 10, the manner in which the main flap 20b is moved rearwardly by the actuating arm 38b is substantially the same as in the first embodiment, so this will not be described further in connection with this third embodiment. As the rotary hinge 40b rotates counterclockwise to swing the actuating arm 38b counterclockwise to cause the rearward motion of the main flap member 20b without substantial rotation of the flap member 20b, the mounting bracket 32b acts against the upper link member 84 to cause rearward motion of the aft flap 78 relative to the main flap 20b so that the aft flap 84 moves out of the stowed position in the trailing edge of the main flap 20b. When the flap assembly 18b has reached the position shown in FIG. 8 (which may be a desired position for high gross weight take-off), the upper surfaces of the wing 10b, the foreflap 20b and the aft flap 78 form a continuous upper aerodynamic surface without slots and with substantially no rotation of the two flaps 20b and 78.

As the main flap 20b is moved further rearwardly to the position of FIG. 9, the main flap 20b and the aft flap 78 move further rearwardly and also downwardly with moderate rotation, to form two slots (one slot being between the main flap 20b and the spoiler 60b and the second slot being between the main flap 20b and the aft flap 78). This is the desired position for STOL take-off.

With further rearward movement of the main flap 20b, there is a substantially greater rotation of the two flaps 20b and 78, and the slots formed by the flap assembly 18b increase in cross-sectional area. The position of FIG. 10 is the fully deployed position for landing.

A fourth embodiment of the invention is shown in FIGS. 11 through 14. Components of this fourth embodiment which are similar to components of the other embodiments will be given like numerical designations, with a "c" suffix distinguishing those of the fourth embodiment. This fourth embodiment provides a double slotted main/aft flap configuration. The mechanism to deploy the aft flap is essentially the same as the track assembly of the main flap, such as that shown in the first embodiment.

Thus, the fourth embodiment has a wing 10c, flap assembly 18c main flap member 20c, mounting structure 22c track assembly 24c with a slide-block 26c and a track member 30c, an actuating arm 38c and a rotary hinge 40c. These components function in substantially the same manner as corresponding components of the first embodiment, so no further detailed description of these components will be given at this point.

In addition to the main flap 20c, there is an aft flap 104 which in the stowed position in FIG. 11 fits snugly in the trailing edge portion of the main flap 20c. This aft flap 104 has a track assembly 106 similar to the main track assembly 24c. Specifically, there is a track member 108 rigidly connected to a bracket 110 connected to the lower part of the aft flap 104. Further, there is a slide-block 112 which is pivotally mounted to the mounting bracket 32c and which slides inside the track member 108.

Extending downwardly and forwardly from the front lower portion of the aft flap 104 is a mounting arm 114 that is pivotally connected at 116 to the lower end of a link 118 that is in turn pivotally connected at 120 to the lower rear part of the main flap 20c. To rotate the link 118 so as to cause motion of the aft flap 104, there is provided a drive link assembly 122, which comprises three links. There is a forward link 124 whose forward end is pivotally connected at 126 to the actuating arm 38c moderately above the connecting location 36c. There is a second intermediate link 128 pivotally connected at its middle portion at 130 to the mounting bracket 32c connected to the main flap member 20c. The lower end of the intermediate link 128 is connected at 132 to the rear end of the forward link 124. The upper end of the intermediate link 128 is connected at 134 to the forward end of a third rear link 136. The rear end of the rear link 136 is pivotally connected at 138 to the lower end of the aforementioned link 118.

To describe briefly the operation of the drive link assembly 122, it is readily apparent that as the actuating arm 38c rotates rearwardly in a counterclockwise direction, the forward link 124 causes a clockwise rotation of the intermediate link 128. This in turn causes the upper connecting point 134 of the intermediate link 128 to move rearwardly, to in turn swing the lower end of the link 118 rearwardly, and thus cause the aft flap member 104 to slide rearwardly along its slide block 112. In a functional sense, the mounting of the aft flap 104 to the structure of the main flap 20c is substantially similar to the mounting of the main flap 20c to the structure of the wing 10. The slide-block 112 and the track member 108 function in substantially the same manner as the slide-block 26c and track member 30c. The drive link assembly 122 in conjunction with the link 118 serves substantially the same function with respect to the aft flap 104 that the actuating arm 38c and rotary hinge 40c serve with respect to the main flap 20c. Thus, it is readily apparent that the operation of each of the two flaps 20c and 104 are functionally quite similar to the operation of the flap member 20 of the first embodiment of FIGS. 1 through 3.

It is believed that the operation of this fourth embodiment is readily apparent from an examination of the operation of the other embodiments, so the operation of this fourth embodiment will be covered only briefly. Counterclockwise rotation of the rotary hinge 40 causes rearward motion of the main flap 20c in substantially the same manner as the first embodiment. In addition, the rearward movement of the actuating arm 38c acts through the drive link assembly 122 in the manner described above to cause the aft flap 104 to move rearwardly relative to the main flap 20c. When the flap members 20c and 104 have reached the position of FIG. 12, a single slot has been formed between the spoiler 60c and the main flap 20c with the aft flap 104 still forming a continuous aerodynamic surface with the main flap 20c. This is the position for high gross weight take-off. Further rotation of the hinge 40c moves the flap members 20c and 104 to the position of FIG. 13, where the aft flap 104 moves a short distance downwardly from the main flap 20c to form a second slot. This is an intermediate position for STOL take-off.

Finally, further rotation of the rotary hinge 40c moves the flap members 20c and 104 moderately rearwardly with substantial rotation to the take-off position as shown in FIG. 14.

One of the advantages of the present invention is that the components can be so positioned relative to one another that the aerodynamic forces exerted on the flap member or members tend to move the flap member(s) toward the stowed position. Not only does this improve safety of the aircraft, but the absence of a load reversal also minimizes the risk of flutter in a no-load position of the flap. The manner in which the forces act to move the flap toward its stowed position are described in FIG. 15.

Figure 15:
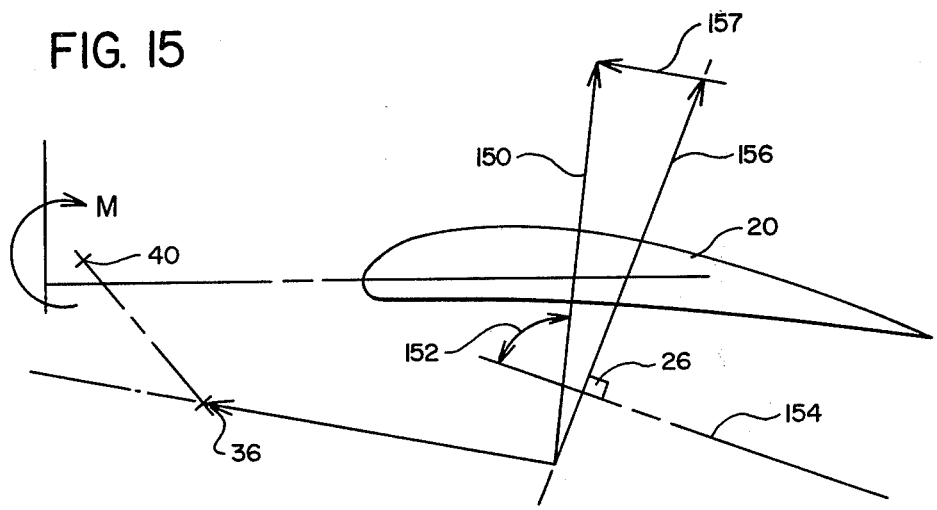
FIG. 15 is a semi-schematic drawing showing the force components acting on the main flap in the present invention.

In FIG. 15, the flap member 20 is shown somewhat schematically near the intermediate position shown in FIG. 2. The location of the slide-block was indicated at 26. The lifting force generated by the flap member 20 is indicated by the arrow 150, and it can be seen that this force 150 makes an acute angle 152 with respect to the longitudinal axis 154 of the slide-way 30. Since the force exerted between the slide-block 26 and the track 30 is necessarily perpendicular to the longitudinal axis 154 of the track 30 (this force component being indicated at 156), the resultant is a forward force component 158. This force component 158 is reacted at the connecting point 36, to create a net clockwise moment at the rotary hinge 40 to tend to move the flap 20 toward its stowed position.

Figure 16:
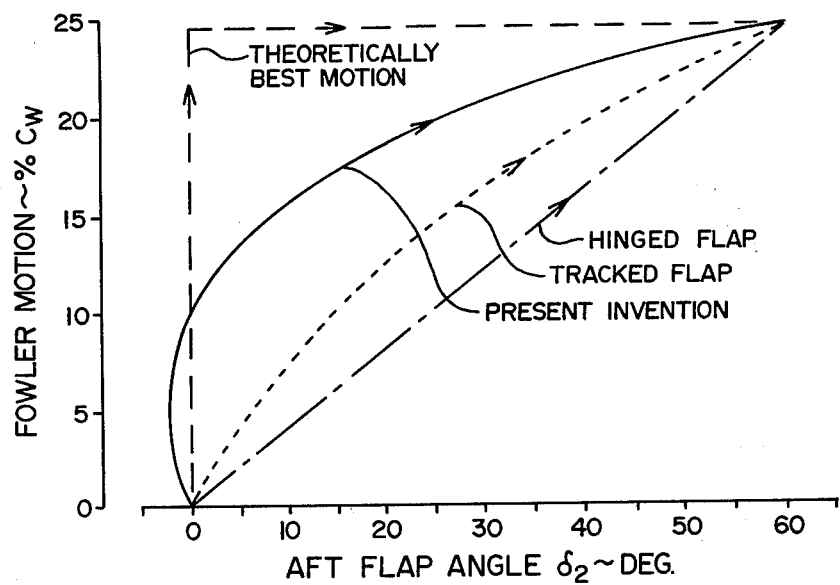
FIG. 16 is a schematic showing the Fowler motion progression versus flap deflection angle for the double slotted flap of the fourth embodiment.

FIG. 16 shows the Fowler motion progression of the double slotted flap of the fourth embodiment (FIGS. 11 through 14). The shape of this curve is typical for all four embodiments. The aft flap angle, and to a lesser degree the main flap angle, become negative during the early part of the flap deployment, which means the flap elements are rotating counterclockwise. Thus both elements reverse their rotation and reach a degree angle the Fowler motion reaches about 10%. For a typical high gross weight take-off flap position of 10 degrees the Fowler motion is 15.5% or ⅔ of the total Fowler motion. By comparison, a double slotted flap of the same size using simple hinges, the Fowler motion at 10 degrees aft flap angle is only 4%.

I claim:

1. A flap assembly for an airfoil having a forward end, a rear end, a longitudinal axis and a transverse axis, said flap assembly comprising:
    (a) a mounting structure located at the rear end of the airfoil, said mounting structure having a track mounting portion at a track mounting location,
    (b) a first flap member having a stowed first position at the rear end of the airfoil, and movable rearwardly through an intermediate second position to a fully extended third position,
    (c) said flap member having mounted thereto a substantially longitudinally aligned track member operatively connected to said track mounting portion for longitudinal and rotational movement relative thereto, said track member having a forward end and a rear end, said track member being characterized in that with the flap member in the first position, the rear end of the track member is at the track mounting location, and with the flap member in its third position, the forward end of the track member is at the track mounting position,
    (d) actuating means operatively connected to said flap member at a connecting location spaced forwardly of the forward end of the track member and having a fixed location relative to the flap member, said actuating means being arranged to move said connecting location substantially longitudinally along a first path component generally aligned with the lengthwise axis of the track to move said flap between the stowed position and the intermediate position so as to cause substantial Fowler motion of the flap with relatively little rotation of the lengthwise axis of the track member relative to the mounting structure at the track mounting location, and to move the connecting location along a second path portion, having a substantial upward path component to move the flap between the intermediate position and the third position so as to cause relatively less Fowler motion with relatively greater rotation of the legthwise axis of the track member relative to the mounting structure at the track mounting location.

2. The flap assembly as recited in claim 1, wherein said actuating means comprises an actuating member which moves along a substantially arcuate path with said first path portion being substantially longitudinally aligned, and said second path portion being substantially vertically aligned.

3. The flap assembly as recited in claim 1, wherein said connecting location is spaced forwardly of the mounting location, said actuating means arranged to move said flap member in a manner that it moves the connecting location substantially longitudinally along a first path portion between the first and second positions of the flap, then along a second path portion which has a substantial upward vertical component in moving the flap member between the second and third position.

4. The flap assembly as recited in claim 3, wherein said actuating means comprises actuating member which moves along a substantially arcuate path with said first path portion being substantially longitudinally aligned, and said second path portion being substantially vertically aligned.

5. The flap assembly as recited in claim 1, wherein said flap member has a chordwise axis and said track member has a lengthwise axis which is substantially linear and along which it moves relative to the mounting portion, the lengthwise axis of the track member extending rearwardly and downwardly relative to the chordwise axis of the flap member.

6. The flap assembly as recited in claim 5, wherein said actuating means comprises an actuating member which moves along a substantially arcuate path with said first path portion being substantially longitudinally aligned, and said second path portion being substantially vertically aligned.

7. The flap assembly as recited in claim 1, wherein said track member comprises a slide-way and said mounting portion comprises a slide-block mounted for slide motion relative to the slide-way.

8. The flap assembly as recited in claim 1, further comprising a fairing pivotally mounted at a forward end thereof for downward movement as said flap member moves from its stowed first position to its third position, said flap assembly having link means to cause downward pivotal movement of said fairing.

9. The flap assembly as recited in claim 1, wherein said track member and said mounting portion are so arranged relative to the actuating means that with said flap member in its intermediate position, said flap member forms a slot between said airfoil and said flap member.

10. The flap assembly as recited in claim 9, wherein there is a vane member mounted to a leading edge of the flap member independent of the airfoil, said vane member being positioned so that with the flap member in its intermediate position, the vane member is located adjacent the rear end of said airfoil and above said slot, said flap assembly being further characterized in that with the flap member in its fully extended third position, the vane member is spaced from the rear end of the airfoil to form a second slot with the airfoil.

11. The flap assembly as recited in claim 1, further comprising a second flap member having a fourth stowed position adjacent said first flap member, and movable rearwardly to an intermediate fifth position and to a fully deployed sixth position, where said second flap member is spaced from said first flap member.

12. The flap assembly as recited in claim 11, wherein said second flap member is mounted to said first flap member by a linkage which causes said second flap member to move longitudinally and angularly relative to said first flap member as the first flap member moves between its first and third positions.

13. The flap assembly as recited in claim 11, wherein said second flap member has a second track member that has a substantial alignment component generally parallel to a chordwise axis of the second flap member, said first flap member having a second track mounting portion to which said second track member is operatively connected for longitudinal movement relative thereto, said flap assembly further having second actuating means to cause said second flap member to move rearwardly relative to said first flap member upon rearward movement of said first flap member.

14. A flap assembly for an airfoil having a forward end, a rear end, a logitudinal axis and a transverse axis, said flap assembly comprising:
   a. a mounting structure located at the rear end of the airfoil, said mounting structure having a track mounting portion at a track mounting location,
   b. a first flap member having a stowed first position at the rear end of the airfoil, and movable rearwardly through an intermediate second position to a fully extended third position,
   c. said flap member having mounted thereto a substantially longitudinally aligned track member operatively connected to said track mounting portion for logitudinal and rotational movement relative thereto said track member having a forward end and a rear end, said track member being characterized in that with the flap member in the first position, the rear end of the track member is at the track mounting location, and with the flap member in its third position, the forward end of the track member is at the track mounting position,
   d. actuating means operatively connected to said flap member at a connecting location spaced forwardly of the forward end of the track member, said actuating means being arranged to move said connecting location substantially longitudinally along a first path component generally aligned with the legthwise axis of the track to move said flap between the stowed position and the intermediate position so as to cause substantial Fowler motion of the flap with relatively little rotation of the lengthwise axis of the track member relative to the mounting structure at the track mounting location, and to move the connecting location along a second path portion, having a substantial upward path component to move the flap between the intermediate position and the third position so as to cause relatively less Fowler motion with relatively greater rotation of the lengthwise axis of the track member relative to the mounting structure at the track mounting location.

15. The flap assembly as recited in claim 14, wherein there is a vane member mounted to a leading edge of the flap member independent of the airfoil, said vane member being positioned so that with the flap member in its intermediate position, the vane member is located adjacent the rear end of said airfoil and above said slot, said flap assembly being further characterized in that with the flap member in its fully extended third position, the vane member is spaced from the rear end of the airfoil to form a second slot with the airfoil.

16. The flap assembly as recited in claim 15, wherein said actuating means comprises an actuating member which moves along a substantially arcuate path with said first path portion being substantially longitudinally aligned, and said second path portion being substantially vertically aligned.

17. The flap assembly as recited in claim 15, wherein said connecting location is spaced forwardly of the mounting location, said actuating means arranged to move said flap member in a manner that it moves the connecting location substantially longitudinally along a first path portion between the first and second positions of the flap, then along a second path portion which has a substantial upward vertical component in moving the flap member between the second and third position.

18. A flap assembly for an airfoil having a forward end, a rear end, a longitudinal axis and a transverse axis, said flap assembly comprising:
   (a) a mounting structure located at the rear end of the airfoil, said mounting structure having a track mounting portion at a track mounting location,
   (b) a first flap member having a stowed first position at the rear end of the airfoil, and movable rearwardly through an intermediate second position to a fully extended third position,
   (c) said flap member having mounted thereto a substantially longitudinally aligned track member operatively connected to said track mounting portion for longitudinal movement relative thereto, said track member having a forward end and a rear end, said track member being characterized in that with the flap member in the first position, the rear end of the track member is at the track mounting location, and with the flap member in its third position, the forward end of the track member is at the track mounting position,
   (d) actuating means operatively connected to said flap member at a connecting location to move said flap member between its first and third positions, said connecting location being spaced longitudinally from the track mounting location, said actuating means being arranged to move the flap member from the first position to the intermediate position in a first path portion having a substantial longitudinal path component to cause substantial Fowler motion of the flap member with relatively little rotation, and the actuating means then moves along a second path portion having a substantial vertical path component to cause substantial rotation of the flap member about the track mounting location in moving from the intermediate position to the third position,
   (e) a second flap member having a fourth stowed position adjacent said first flap member, and movable rearwardly to an intermediate fifth position and to a fully deployed sixth position, where said second flap member is spaced from said first flap member, said second flap member being mounted to said first flap member by a linkage which causes said second flap member to move longitudinally and angularly relative to said first flap member as the first flap member moves between its first and third positions.

19. The flap assembly as recited in claim 18, wherein said actuating means comprises an actuating member which moves along a substantially arcuate path with said first path portion being substantially longitudinally aligned, and said second path portion being substantially vertically aligned.

20. The flap assembly as recited in claim 18, wherein said connecting location is spaced forwardly of the mounting location, said actuating means arranged to move said flap member in a manner that it moves the connecting location substantially longitudinally along a first path portion between the first and second positions of the flap, then along a second path portion which has a substantial upward vertical component in moving the flap member between the second and third position.

21. A flap assembly for an airfoil having a forward end, a rear end, a longitudinal axis and a transverse axis, said flap assembly comprising:
   (a) a mounting structure located at the rear end of the airfoil, said mounting structure having a track mounting portion at a track mounting location,
   (b) a first flap member having a stowed first position at the rear end of the airfoil, and movable rearwardly through an intermediate second position to a fully extended third position,
   (c) said flap member having mounted thereto a substantially longitudinally aligned track member operatively connected to said track mounting portion for longitudinal movement relative thereto, said track member having a forward end and a rear end, said track member being characterized in that with the flap member in the first position, the rear end of the track member is at the track mounting location, and with the flap member in its third position, the forward end of the track member is at the track mounting position,
   (d) actuating means operatively connected to said flap member at a connecting location to move said flap member between its first and third positions, said connecting location being spaced longitudinally from the track mounting location, said actuating means being arranged to move the flap member from the first position to the intermediate position in a first path portion having a substantial longitudinal path component to cause substantial Fowler motion of the flap member with relatively little rotation, and the actuating means then moves along a second path portion having a substantial vertical path component to cause substantial rotation of the flap member about the track mounting location in moving from the intermediate position to the third position,
   (e) a second flap member having a fourth stowed position adjacent said first flap member, and movable rearwardly to an intermediate fifth position and to a fully deployed sixth position, where said second flap member is spaced from said first flap member,
   (f) said second flap member having a second track member that has a substantial alignment component generally parallel to a chordwise axis of the second flap member, said first flap member having a second track member which is operatively connected for longitudinal movement relative thereto, said flap assembly further having second actuating means to cause said second flap member to move rearwardly relative to said first flap member upon rearward movement of said first flap member.

22. The flap assembly as recited in claim 21, wherein said actuating means comprises an actuating member which moves along a substantially arcuate path with said first path portion being substantially longitudinally aligned, and said second path portion being substantially vertically aligned.

23. The flap assembly as recited in claim 21, wherein said connecting location is spaced forwardly of the mounting location, said actuating means arranged to move said flap member in a manner that it moves the connecting location substantially longitudinally along a first path portion between the first and second positions of the flap, then along a second path portion which has a substantial upward vertical component in moving the flap member between the second and third position.

24. The flap assembly as recited in claim 21, wherein said flap member has a chordwise axis and said track member has a lengthwise axis along which it moves relative to the mounting portion, the lengthwise axis of the track member extending rearwardly and downwardly relative to the chordwise axis of the flap member.

25. The flap assembly as recited in claim 21, wherein said track member comprises a slide-way and said mounting portion comprises a slide-block mounted for slide motion relative to the slide-way.

* * * * *